Figures 1, 5:
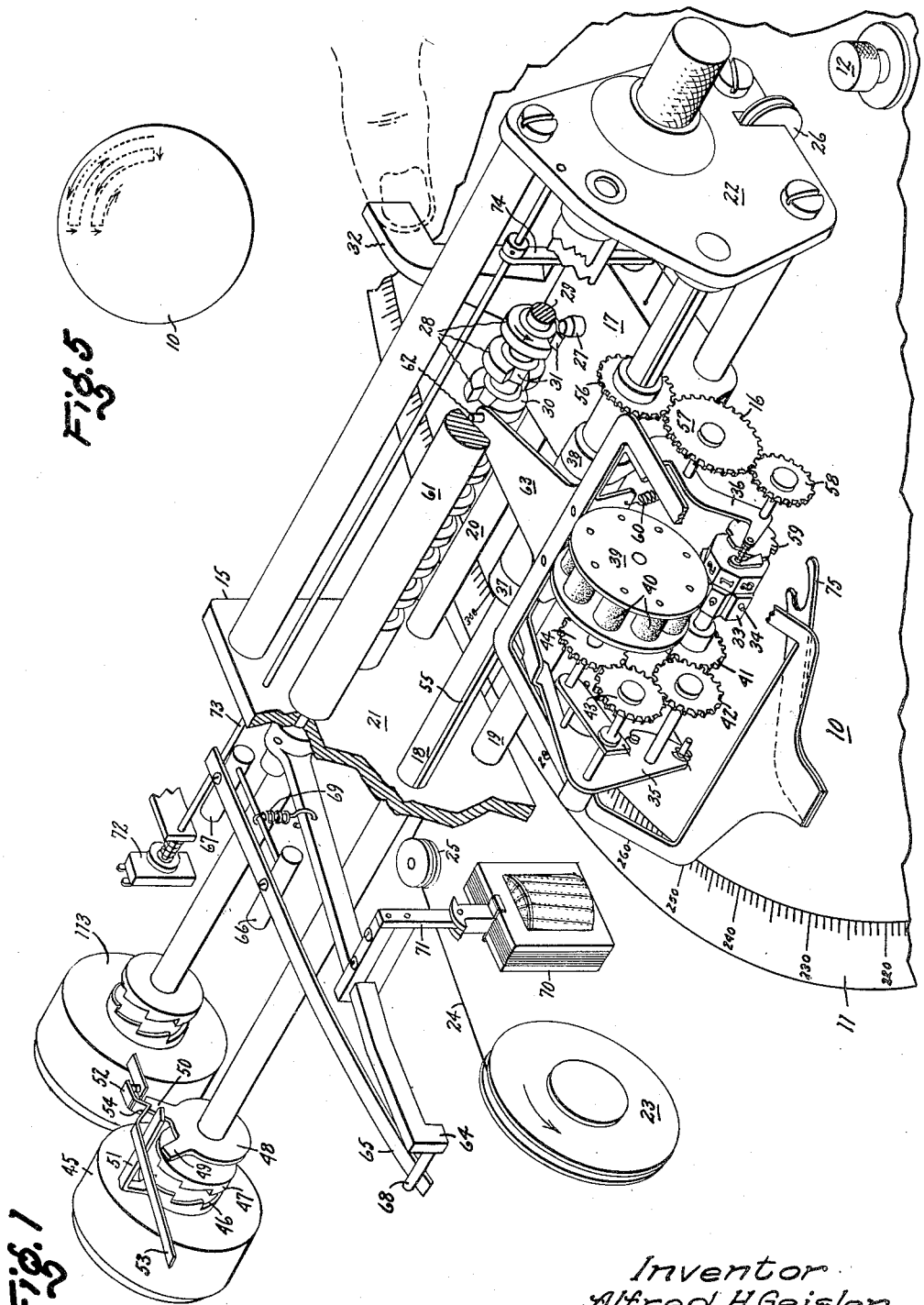

Aug. 28, 1956

A. H. GEISLER 2,761,068

AUTOMATIC POLE FIGURE RECORDER

Filed Oct. 15, 1953

2 Sheets-Sheet 1

Inventor
Alfred H. Geisler
by Crowell F. Snack
His Attorney

Aug. 28, 1956  A. H. GEISLER  2,761,068
AUTOMATIC POLE FIGURE RECORDER
Filed Oct. 15, 1953  2 Sheets-Sheet 2
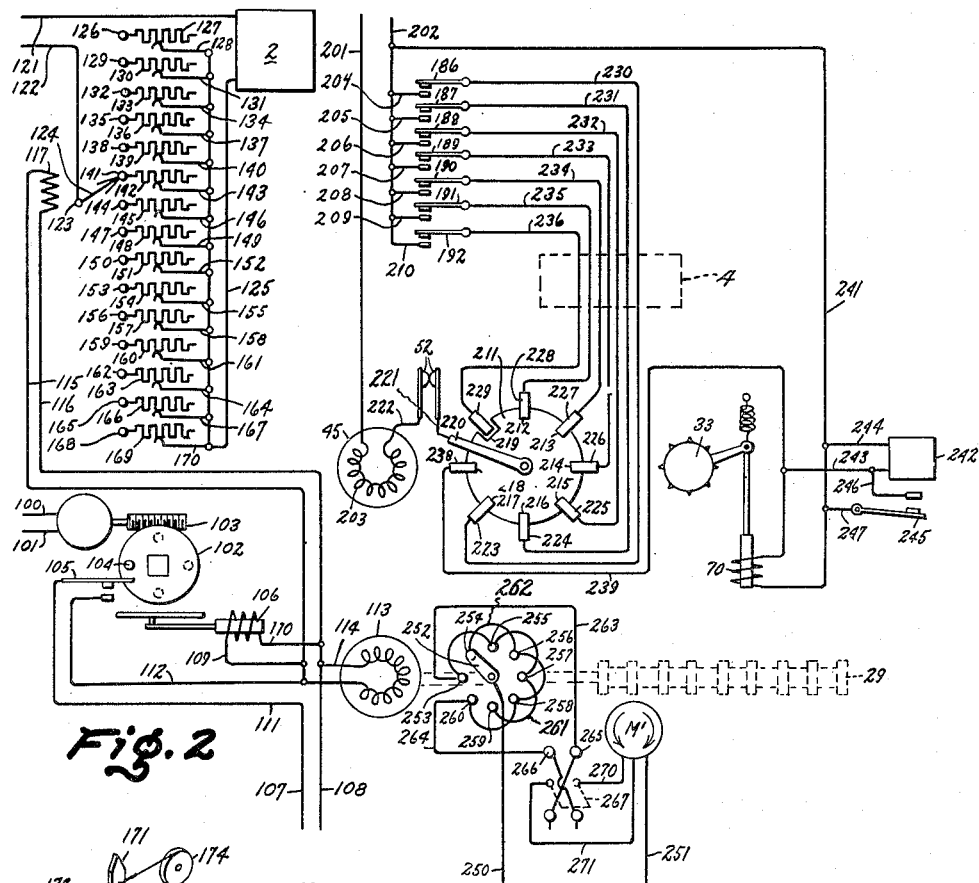
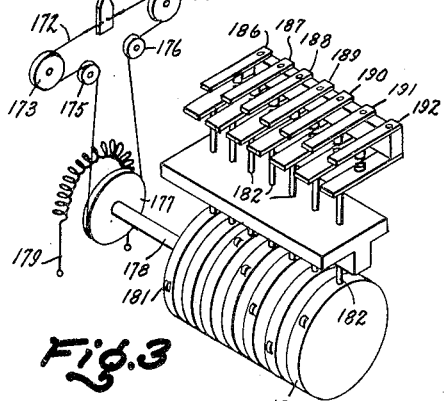
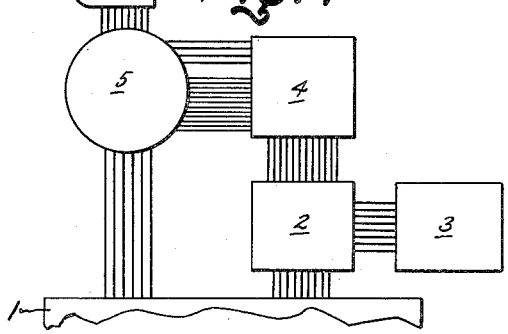
Inventor
Alfred H. Geisler
by Prowell & Nack
His Attorney United States Patent Office 2,761,068
Patented Aug. 28, 1956

2,761,068

AUTOMATIC POLE FIGURE RECORDER

Alfred H. Geisler, Schenectady, N. Y., assignor to General Electric Company, a corporation of New York Application October 15, 1953, Serial No. 386,180

4 Claims. (Cl. 250—52)

This invention relates to apparatus used in the examination of materials by means of X-rays and more particularly to a means for automatically recording and plotting data obtained from an X-ray spectrogoniometer to produce a pole figure of a sample under investigation.

This invention represents a step forward in the art of determining the preferred orientation or "texture" of crystallites in materials by means of X-ray diffraction. During the last few years, methods employing the Geiger counter X-ray diffraction spectrogoniometer have largely replaced the slow and less quantitative film techniques for determining such preferred orientation, as is well known in the art. Previously, however, the data from such a determination was recorded in the form of a continuous line on a strip chart. This data was then abstracted from the strip chart, intensity correction factors applied to compensate for geometrical errors introduced by varying effective specimen thickness, and the corrected data hand plotted on a circular chart. This resulting plot is called a pole figure and is a graphical representation of the preferred orientation of the specimen in stereographic projection, as is well known in the art.

One of the objects of this invention is the provision of apparatus which, when used in conjunction with known X-ray spectrogoniometer equipment, will automatically compensate the resulting diffraction data for errors introduced by absorption and automatically plot the so-compensated data as points on a conventional-type pole figure chart.

Another object of this invention is the provision of automatic pole figure recording apparatus which automatically compensates for absorption errors arising out of the changing effective thickness of the specimen under examination.

A further object of this invention is the provision of apparatus for plotting X-ray diffraction pole figures which is completely automatic in the sense that after the operator starts the apparatus, no other supervision is needed and the investigation will proceed to completion and the apparatus will then shut itself off.

A further object of this invention is the provision of apparatus for plotting X-ray diffraction pole figures in which the apparatus is adjustable to produce one or two quadrant pole figures directly, thus cutting the scanning time to one-fourth or one-half, respectively, of that required for a four-quadrant pole figure.

A further object of this invention is the provision of apparatus which will analyze the varying intensity of diffracted X-rays produced during the examination of a specimen in a spectrogoniometer and from these signals directly plot the pole figure of the specimen in stereographic projection.

The invention will be better understood from the following description taken in conjunction with the accompanying drawings, in which Fig. 1 is a semi-schematic perspective view of the pole figure recorder with parts broken away for clarity, Fig. 2 is a schematic diagram of the various circuits involved, Fig. 3 is a semi-schematic perspective view of a detail, Fig. 4 is a schematic illustration of the various components of the apparatus, and Fig. 5 is a schematic diagram illustrating one of several possible trace paths of recorded information.

The general organization of components of the apparatus used to produce pole figure recordings is best described by reference to Fig. 4. As has been previously stated, Fig. 4 is a schematic representation of the elements and is useful for a better understanding of the apparatus. Reference numeral 1 is applied to X-ray apparatus, specifically a General Electric model XRD-3 spectrogoniometer or any equivalent apparatus. This includes a source of collimated X-rays and a detection device for X-rays such as a Geiger counter or the like, which will transmit, by means of a rate meter, an electrical signal, the strength of which varies directly with the intensity of the X-rays received by the detection device. Since the specific details of this device are well known, no further description is deemed necessary.

Reference numeral 2 is applied to apparatus which receives the signal from the Geiger counter of spectrogoniometer 1 and by means of a slide wire potentiometer control, or the like, positions a pen relative to a predetermined position on a traveling strip chart. A conventional Leeds and Northrup strip recorder, or the like, may be used, providing it is capable of modification as will be set forth later.

Reference numeral 3 represents apparatus for applying an intensity correction factor to the signal from the Geiger counter to the strip recorder to compensate for absorption errors introduced by the geometrical effect associated with rotation of the specimen, as will be more fully discussed later.

Reference numeral 4 is applied to the pole figure recorder printer controls which function to transmit signals for the operation of the printing head in response to signals controlled by the modified strip recorder. These controls comprise a series of conventional relays and as such have only been schematically indicated.

Reference number 5 is applied to the pole figure recorder, which will be described in more detail subsequently.

Reference number 6 is applied to the specimen goniometer. This specimen goniometer or mount may be of any satisfactory type, such as, for example, that disclosed by application Serial No. 322,126, filed July 20, 1951, now Patent No. 2,713,125 of which I am a joint inventor.

The specific details of the pole figure recorder will now be described. The recorder is provided with a horizontally arranged disc-like turntable, not shown, which supports a circular chart 10 which has its periphery marked off in degrees as shown at 11. The chart 10 is secured to the turntable for rotation therewith by means of a knurled fastening nut 12 which threads onto a suitable stud in the center of the turntable. The turntable is driven by a reversible motor M', the operation of which will be described in more detail later.

A supporting structure, generally indicated by reference numeral 15 and structure associated therewith, carries the printing mechanism. The printing is accomplished by means of a printing head generally indicated by numeral 16 and comprises an approximately L-shaped carrier element 17 which is slidably supported by parallel rods 19 and 20 which pass through apertures in one of the legs of the L-shaped carrier and in the area of intersection of said legs. Drive rod 18 passes through an aperture in the other leg of said carrier, as shown.

Rods 18, 19 and 20 are supported in fixed relation to each other by means of plates 21 and 22, and the said rods are parallel to and a fixed distance from a radius of the turntable. Carrier 17 is biased toward plate 22 by means of a conventionally shown spring-biased reel 23, to which is secured one end of cable 24. Cable 24 is carried over pulleys 25 and 26 and has its other end secured to carrier 17, as shown. Carrier 17 is provided with a pin 27 which is adapted to be depressed into the body of carrier 17 and is normally spring-urged outwardly to the position illustrated. It is to be noted that the outer end of pin 27 is chamfered or beveled for a purpose to be later disclosed. Pin 27 acts as a stop to limit motion of carrier 17 along rods 18, 19 and 20 by its engagement with one of the several collars 28 on collared shaft 29. Each collar 28 has a beveled face 30, as shown, and each collar is provided with a notch 31. The notches 31 in the collars 28 are displaced from those in collars adjacent by an angle of 45° so that as shaft 29 and collars 28 are rotated one-eighth of a revolution in the direction indicated by the curved arrow, a notch 31 on the collar 28 against which pin 27 is then being urged will come into register with pin 27. The spring-urged cable 24 will then move carrier 17 and pin 27 inwardly with respect to the periphery of the turntable until the pin engages and is stopped by the next collar 28. In this manner, it will be seen that the carrier 17 may occupy a plurality of predetermined positions, moving in successive steps from a position adjacent the periphery of the chart 10 to an end position adjacent the center of the chart. Shaft 29 is rotated in 45° steps by a solenoid motor 113, as will be more fully discussed later. A thumb piece 32 is integrally carried by carrier 17 so that it may be moved to a reset position adjacent the periphery of the chart. When thumb piece 32 is pushed as illustrated, the beveled faces 30 of collars 28 coact with the tapered portion of biased pin 27 to depress pin 27, resulting in a ratcheting effect and thereby permitting carrier 17 to be moved back to its initial position.

The actual printing is accomplished by an eight-position rotary positionable printer 33 of octagonal shape, each face of the octagon carrying a means which is distinguishable from the others. In this particular arrangement, however, only seven of the eight positions are used to print. In the particular embodiment illustrated, each of the seven faces is provided with a stud-like element 34, each of which is adapted to print a dot or mark of a single, unique color. The eighth position is used for "homing" purposes, which will be more fully explained later. It will be understood, however, that the printer could be modified to print individual numbers or other symbols rather than different colors. The printer is supported by a pair of arms 35, 36 of a yoke-like frame which is pivotally supported on rod 18 and engages carrier 17 on either side by means of bushings 37 and 38 so that the printer support frame travels with carrier 17 along rod 18. A reel 39 supports ink pads 40, each being impregnated with a different color of ink and each pad being indexed to a particular printing stud by means of the gear train 41, 42, 43 and 44. As is apparent from Fig. 1, gear 41 rotates with octagonal printer 33 and reel 39 is rotated by gears 42, 43 and 44 in a 1:1 ratio with printer 33. From this, it is apparent that each stud 34 is always inked by the same pad 40 and by no other pad.

The selection of the particular printing stud 34 to be used is accomplished by the step-wise rotation of shaft 18 by means of an eight-position driving solenoid 45, which is provided with a ratchet-type clutch element 46, which, upon energization of solenoid 45, first engages a mating clutch element 47 secured to shaft 18 and then rotates shaft 18 one-eighth of a revolution. A breaker point and lost motion cam assembly is provided for solenoid 45 so that when solenoid 45 has driven shaft 18 one-eighth of a revolution, the power supply to solenoid 45 is interrupted, permitting clutch element 46 to disengage from element 47 and power will not be again available to the solenoid until it is returned by an internal biasing means (not shown) to its initial position. This is accomplished by means of a lost motion cam element 48 which is provided with an arm 49 and a lobe 50. Clutch element 46 carries an actuating arm 51 which extends between arm 49 and lobe 50 of cam 48 and is adapted to alternately contact them. Power is supplied to solenoid 45 through breaker assembly 52 of which one arm 53 is a spring arm normaly biasing the points of the breaker assembly 52 closed. Arm 53 has a portion 54 which lobe 50 may contact to open the points, and thereby interrupt the power supply of solenoid 45. Cam element 48 is supported on shaft 18 and frictionally engages housing elements (not shown) so that it tends to remain in position regardless of motion of shaft 18. At the start of an energizing cycle, the breaker points 52 are closed and current flows into solenoid 45. The clutch elements 46 and 47 engage and the solenoid 45 rotates shaft 18 one-eighth of a revolution. Arm 51 then engages arm 49 and rotates cam 48 until lobe 50 engages and lifts breaker arm contact portion 54, breaking points 52 and de-energizing solenoid 45. The clutch elements 46 and 47 disengage and the solenoid 45 is biased back to its initial position. Points 52 are held in the open position by lobe 50 until arm 51 engages lobe 50 and moves it back to its initial position, allowing points 52 to close. If current is available to energize the solenoid, this cycle is then repeated. From this, it is apparent that shaft 18 may be rotated in one direction in a series of one-eighth revolution steps.

Shaft 18 is provided over a portion of its length with a slot or key-way 55. A gear train 56, 57 and 58 is carried by the printing head 16 for motion therewith along rods 18, 19 and 20 and transmits rotary motion of shaft 18 to printer 33 by means of a keying element carried by gear 56 which coacts with key-way 55. An eight-step ratchet and pawl assembly 59 prevent retrograde motion of the drive assembly consisting of elements 47, 48, 56, 57 and 58, and further aids in the indexing of studs 34 in their proper printing positions.

As was previously pointed out, the printer and associated elements are pivotally supported from rod 18. The printer is biased toward the printing position (i. e., toward a position where the lowermost stud 34 is in contact with chart 10) by a spring 60. It is held in an elevated position opposing the bias of spring 60 by means of a flattened shaft 61. The substantially planar surface of shaft 61 engages a pin 62 which is carried by an arm 63 which is integrally connected to printer support arms 35 and 36. It will be noted that the point of contact between pin 62 and shaft 61 is eccentric with respect to the axis of shaft 61, so that when shaft 61 is rotated a small amount in the appropriate direction, spring 60 will urge the printer downwardly and the lowermost stud 34 will contact chart 10, thereby printing on said chart. Shaft 61 is driven by means of a radially attached arm 64 which is biased upwardly by means of bar spring 65, supported by rods 66 and 67, the spring 65 engaging pin 68 on arm 64, and coil spring 69. In this position, springs 65 and 69 oppose spring 60 and hold the printer away from chart 10. Arm 64 is pulled downwardly by solenoid 70 acting through link 71, whereby springs 65 and 69 are overpowered, shaft 61 is rotated slightly and spring 60 biases printer 33 downwardly until the lowermost stud 34 contacts chart 10.

A safety limit switch 72 may be provided to automatically stop the apparatus when a complete examination of a specimen is desired. A spring-biased push rod 73 carries an adjustable contact arm 74 which, when engaged by carrier 17, will longitudinally move rod 73, breaking the circuit through switch 72 and causing the apparatus to stop.

A spring finger 75 is carried by the printer and functions to smooth the chart 10 ahead of the printer.

As was previously stated, rods 18, 19 and 20 are parallel to each other and parallel to a radius of the turntable. These rods are spaced a distance from said radius so that the printer will print on said radius.

The various electrical circuits and associated structure as illustrated in Figs. 2 and 3 will now be discussed and explained.

Leads 100 and 101 supply motor M with 110-volt, 60-cycle power which drives the specimen holder 102 around a substantially horizontal axis at a predetermined rate by means of a conventional worm gear 103. Holder 102 is provided with at least one switch actuating means such as a pin 104, by means of which normally open switch 105 is closed. It will be understood that holder 102 may be provided with a pair of such means 104 spaced 180° apart, or with four, equally spaced 90° apart, as indicated in phantom in Fig. 2, if desired. Holder 102 is supported for rotation about a substantially vertical axis in 5° increments. This is accomplished by means of solenoid 106 which is connected to a 24-volt power supply 107, 108 by means of leads 109, 110. Switch 105 connects leads 111, 112, lead 111 being connected to lead 107, and lead 112 supplying power to solenoid motor 113 which is similar to solenoid motor 45 which serves to position the printer with respect to various alpha angles of the specimen, and is equipped with a similar ratchet clutch. Line 114 completes the circuit between solenoid motor 113 and lead 108. Leads 115 and 116 connect actuating coil 117 of a conventional stepping switch to leads 112 and 108, respectively.

Leads 121 and 122 are connected to the Geiger counter and rate meter of the XRD-3 X-ray machine 1, lead 121 being terminated at one of the input terminals of the strip recorder 2. Lead 122 is connected to terminal 123 of the movable contact 124 of the stepping switch. Contact 124 is constructed to complete the circuit between lead 122 and lead 125 to the other input terminal of the strip recorder 2 through contacts 126, 129, 132, 135, etc., resistances 127, 130, 133, 136, etc., and leads 128, 131, 134, 137, etc., respectively, in sequence and in changing from one to the next in response to the energizing of actuating coil 117. Each resistor applies a correction for the variation in intensity of the signal from the Geiger counter due to absorption by the specimen because of the geometrical effect associated with rotation of the specimen about the vertical axis which produces a change in the path length of the X-rays through the specimen under radiation. This changes the range of the strip recorder 2 to equilibrate pen positions across the chart to give the same response for comparable intensity levels for various alpha angles of the specimen about the vertical axis.

As is shown in Fig. 3, the strip recorder pen 171 is driven across the strip chart by means of cable 172 which is guided by pulleys 173, 174, 175 and 176 and is connected to driving drum 177 which is supported by shaft 178. The position of the pen is controlled by a conventional slide wire self-balancing motor control system shown schematically at 179. It should be noted that the foregoing is conventional strip recorder structure. Shaft 178 drives drum 180, which drum comprises seven or more substantially identical discs, each having a cam 181 on its outer periphery. Each cam 181 is adapted to engage one of a plurality of push rods 182 at a given angular deflection of drum 180. These push rods 182 are each associated with normally open intensity level switches 186 through 192 and each switch will be closed when its corresponding cam 181 engages and moves its push rod 182 in response to varying pen positions across the strip chart.

The recorder is provided with two 110-volt driving circuits, one relating to the printing operation, and the second to the driving of the chart.

The circuit relating to the printing operation comprises a source of 110-volt D. C. power from which extend leads 201 and 202. Lead 201 is directly connected to one end of actuating coil 203 of an eight-position driving solenoid 45, the function of which will be described in more detail subsequently. Lead 202 is connected to one side of the normally open intensity level switches 186 through 192 by leads 204 through 210, as shown. Solenoid 45 is connected to shaft 18 so as to cause it to rotate one-eighth of a revolution per energization by means of ratchet clutch elements 46 and 47, shown in Fig. 1. Shaft 18, in turn, drives rotary member 211 in, for example, a clockwise direction, as indicated in Fig. 2, moving it in steps of one-eighth revolution. Shaft 18 further rotates the printer 33 in one-eighth revolution steps as previously described. Rotary member 211 is provided with seven peripheral contacting stations 212 to 218 arranged 45° apart, proceeding from station to station in numerical order, with a 90° interval between stations 218 and 212. Midway between stations 218 and 212, i. e., 45° behind station 212 as member 211 is rotated clockwise with respect to a reference point, is a notch 219 somewhat larger in area than the contacting stations 212 to 218. Member 211 is provided with a contact 220 which establishes an electrical conducting path between member 211 and the other end of coil 203 by way of lead 221, breaker points 52 and lead 222. Breaker points 52 are normally closed and are opened by means of a lost motion cam 48 described elsewhere. Intensity level switches 186 to 192 are connected to contact points 223 to 229, respectively, by leads 230 to 236 through a conventional relay system shown in chain lines at 4. The purpose of the relay system is to control the 110-volt D. C. supply to solenoid 45 by means of 24-volt D. C. actuated relays controlled by switches 186 through 192 and 211, 212 to 218 rather than as shown. An eighth contact point 238 is provided for "homing" purposes which will be explained later, and is connected by lead 239 through printing solenoid 70 back to lead 202 by means of lead 241. It will be seen by inspection that the contact points 223 to 229 and 238 are equally spaced about the periphery of member 211 and with the exception of the contact point in register with notch 219, all the contact points are in register with a corresponding contact station on the member 211. The drive motor 242 of a time delay switch 245 of conventional construction is connected across leads 239 and 241 by means of leads 243 and 244, respectively, for a purpose to be disclosed later. The delay switch 245 that is actuated by the above motor is connected between leads 243 and 241 by leads 246 and 247, respectively, to enable solenoid 70 to be removed from the circuit.

The circuit relating to the chart drive receives its power from a 110-volt source through leads 250 and 251. Solenoid motor 113, energized by switch 105, rotates collared shaft 29 step-by-step in 45° increments as described elsewhere. Connected to and rotating with shaft 29 is contact 252 which receives energy through lead 250. Eight equally spaced contact points 253 to 260 are peripherally arranged around contact 252 so as to be sequentially contacted by 252 as shaft 29 is rotated. Alternate contact points 253, 255, 257 and 259 are interconnected by lead 261, and contact points 254, 256, 258 and 260 are interconnected by lead 262. Leads 261 and 262 are connected to terminals 265 and 266 of a reversing switch 267 by leads 263 and 264. Leads 270 and 271 connect the center terminals of switch 267 to reversible motor M and lead 251 provides the third lead to motor M'. It is to be noted that motors M and M' are so selected or geared that a 360° rotation of specimen holder 102, driven by motor M, is accomplished in the same time as a 360° rotation of the chart turntable driven by motor M'.

The operation of the recorder and associated apparatus will now be described in detail. A clean sheet of record paper 10 is placed on the turntable and indexed thereon. Printer head 16 is moved to its initial position adjacent the outer periphery of the chart. Specimen holder 102 is positioned at its starting alpha angle with respect to the incident X-ray beam. Holder 102 is rotated about its horizontal axis in its normal direction of rotation until switch actuating means 104 has just permitted switch 105 to open. The specimen goniometer and the pole figure recorder are simultaneously started. The reversing switch 267 is positioned so as to produce clockwise rotation of the turntable, if desired.

Diffracted X-rays are received by the Geiger counter and a signal of intensity that varies with the two angles of the specimen in its goniometer is transmitted by leads 121, 122 to the strip recorder 2 via the intensity corrector. The stepping switch contact 124 is at a starting position, for example, at contact 126. Since the resistors of the intensity corrector 127, 130, 133, etc., were preset for making appropriate corrections depending on the alpha angle of the specimen, the signal from the Geiger counter is corrected by resistor 127 and such corrected signal is received by the strip recorder 2. The drive for pen 171 in the strip recorder 2 turns shaft 178 in response to the corrected signal and cams 181 are moved toward or away from their respective switch actuating pins 182, said pins actuating their respective intensity level switches of the group 186 to 192.

Assume contact 252 is positioned at contact point 253 completing the turntable motor M' circuit through lead 250, contact 252, contact point 253, lead 263, terminal 265, switch 267, lead 270, motor M' and lead 251, driving motor M' so as to produce a clockwise rotation of the turntable. Assume switch 188 is closed by its pin 182. Further assume that member 211 is in its initial position with notch 219 opposite contact 238. Current flows through lead 232, contact 225, member 211, contact 220, lead 221, closed points 52, lead 222, coil 203 and lead 201. Solenoid 45 is energized, turning member 211 one-eighth of a revolution clockwise. When solenoid 45 is completely energized, points 52 are opened by lost motion cam 48, breaking the circuit and the solenoid returns to its starting position, but member 211 remains in its advanced position due to disengagement of the ratchet clutch elements 46 and 47. When the solenoid has returned to its de-energized position, lost motion cam 48 is moved by arm 51 to permit points 52 to close. Inasmuch as contact 225 is still in contact with a contacting station on member 211, the solenoid is again energized, and the cycle repeats until notch 219 progressively moves to a position adjacent contact 225, at which time, when the solenoid de-energizes and points 52 are allowed to close, the circuit is open between contact 225 and member 211. It will be noted that at the beginning of the cycle, contact 238 was adjacent notch 219 and an open circuit existed at that point. After the first energization of the solenoid, this open circuit was closed by the contact of 238 with contacting stations 218, 217, 216, 215, 214, respectively, completing a circuit comprising lead 201, coil 203, lead 222, points 52, lead 221, contact 220, member 211, contact 238, lead 239, printing solenoid 70, lead 241 and lead 292, which is in parallel with the previous delineated circuit. Until the previous circuit is opened by notch 219 arriving adjacent contact 225, there is insufficient current flowing through solenoid 70 to operate it. When the printer selector circuit is opened and breaker points 52 remain closed, there is then sufficient current to operate solenoid 70 to depress the printing head and print the selected numeral or color on the chart. The time delay switch 245 is normally open, but after a short time interval after solenoid 70 has been actuated, this switch closes, completing the circuit between leads 239 and 241, shorting out solenoid 70 to allow the printer to return from the depressed position. Inasmuch as the circuit through solenoid 45 will now be completed through lead 238 with solenoid 70 shorted out by switch 245, sufficient current will flow so that the solenoid will again operate in a step-by-step manner until notch 219 returns to its initial position adjacent lead 238, thereby opening that circuit, allowing the time delay to reset. The complete cycle may then start again when switch 188 is again closed or any other switch of the group 186 to 192 is closed. It is obvious that due to varying intensities of signals, various ones of the switches 186 to 192 will be closed from time to time causing the printer to take correspondingly different positions and therefore to print correspondingly different symbols or colors on the chart during its rotation.

After the sample has completed one revolution, assuming that only one switch actuating means 104 is being used, the chart having correspondingly completed one revolution and many points have been recorded in response to the closing of switches 186 to 192, switch 105 is closed by switch actuating means 104, energizing solenoid 106 which shifts holder 102 about its vertical axis a predetermined amount, for example, 5°. At the same time coil 117 of the stepping switch is energized, shifting switch contact 124 to a new position, for example, from contact 126 to contact 129. This corrects the signal from the Geiger counter by a predetermined factor corresponding to the new effective sample thickness by means of resistor 130. Simultaneously, solenoid motor 113 is energized and turns collared shaft 29 45°, which shifts the printing head radially with respect to the chart an increment corresponding to the change in the alpha angle of the specimen holder. At the same time contact 252 is moved from contact point 253 to contact point 254, for example. The direction of rotation of motor M' is reversed, the new circuit now being through lead 250, contact 252, contact point 254, lead 262, lead 264, terminal 266, switch 267, lead 271, motor M' and lead 251. It may be here stated that if desired, the turntable may be driven continuously in one direction during the entire examination of a specimen by the omission of the cyclic reversing switch shown by reference numbers 252 through 262, in which case lead 250 would be connected directly to one of the terminals, terminal 266, for example, of reversing switch 267. This may be accomplished in one of several ways. In the embodiment of the invention which I have constructed, a double throw switch is installed with lead 250 connected to its center terminal, and one of the outer terminals connected to contact 252 and the other terminal connected to terminal 266. Since such an expedient is quite obvious, it has not been shown in order to keep the wiring diagram as simple as possible.

The object of changing the direction of rotation of motor M' is to permit recording of data in one or two quadrants of the chart when respectively four or two switch actuating means 104 are used. When only one means 104 is used, the chart may be continuously rotated in one direction. Fig. 5 is a schematic diagram of chart 10 showing the path on chart 10 presented to the printer when four switch actuating means 104 spaced 90° apart on member 102 are used, thereby recording in only one quadrant of the chart. It is obvious that such a recording is primarily useful when the specimen under examination has four-fold symmetry. It is apparent that when only two switch actuating means 104, spaced 180° apart, are used, the arcuate paths in Fig. 5 will extend through two adjacent quadrants of chart 10.

While I have shown and described particular embodiments of the invention, I do not wish to be limited thereto and intend in the appended claims to cover all changes and modifications as fall within the true spirit and scope of the invention.

What I claim as new and desire to secure by Letters Patent of the United States is:

1. Apparatus for producing an X-ray diffraction pole figure comprising, a source of collimated X-ray beams, means for mounting a substantially planar specimen so that its surface is impinged by the beam of X-rays, means for moving said specimen mount about two axes perpendicular to each other, means to receive X-rays diffracted by said specimen which responds to varying intensities of said diffracted X-rays to produce an electrical signal, the strength of which varies in direct proportion to the diffracted X-ray beams, means associated with said specimen mounting means to compensate said varying electrical signal for geometrical effects produced by different specimen positions, means for printing a plurality of different indicia, means responsive to the compensated electrical signal to select one of the indicia for each of a plurality of different preselected signal intensities, a circular chart, means for continuously rotating said chart in synchronism with the motion of the specimen about one of its axes, means to cause the printer to print upon the chart, and means coordinated with the motion of the specimen mount about its other axis to move said printing means radially with respect to said chart.

2. Apparatus as defined by claim 1 in which the means for moving said specimen mount about two axes perpendicular to each other comprises a motor and transmission means which continuously revolves the substantially planar specimen and its support about an axis perpendicular to the planar surface of said specimen, said support being provided with switch actuating means, a normally biased open switch adapted to be closed by said switch actuating means, a source of power connected to one side of said switch, a plurality of solenoids connected in parallel to the other side of the switch and adapted to be energized when said switch is closed, one of said solenoids being operative when energized to rotate said specimen support a discrete angular increment about a second axis which passes through the specimen and is perpendicular to the first-mentioned axis, the resulting motion of said specimen mount being in substantially continuous rotation about the first-mentioned axis and in intermittent rotation about the second axis.

3. Apparatus as defined by claim 2 in which the means associated with said specimen mounting means to compensate said varying electrical signal for geometrical effects produced by different specimen positions comprises a plurality of adjustable resistors, each having one end connected to a common lead, the other end of each resistor being provided with a contact point, a movable stepping switch contactor arm adapted to be sequentially moved from one resistor contact point to the next in a predetermined order, a switch contactor arm operating solenoid or actuating coil, said coil being energized momentarily each time the specimen mount is moved in intermittent fashion about one of its axes, and when so energized said coil acts to move said contactor arm from the position it is then occupying to its next scheduled position.

4. Apparatus as defined by claim 1 in which the means for printing a plurality of different indicia comprises a rotary member having a number of printing elements on its periphery, each element capable of printing a different indicium, the means responsive to the compensated electrical signal to select one of the indicia for each of a plurality of different signal intensities comprising a pair of primary leads connected to a source of electrical power, one of said primary leads being connected to one of the terminals of a number less by one than the number of printing elements of normally open switches, means responsive to a varying continuous electrical signal for selecting and closing one of said switches when the signal reaches a predetermined intensity, each switch being closable by said means at a different predetermined signal intensity, and not more than one switch is closed at any one instant, the other said primary lead being connected to one input terminal of a solenoid motor which operates in a step-by-step manner to rotate the rotary printing member, the number of steps per revolution of said motor being equal to and indexed to the number of printing elements and leads connecting the other terminals of said switches to corresponding terminals of the solenoid motor so that when one of the switches is closed, the solenoid motor will be energized in a step-by-step fashion to rotate the said member to bring a printing indicium corresponding to a particular signal intensity into the printing position.

References Cited in the file of this patent

UNITED STATES PATENTS

| 2,490,673 | Champaygne et al. | Dec. 6, 1949 |
| 2,619,600 | Hamacher | Nov. 25, 1952 |